Patented Jan. 7, 1930

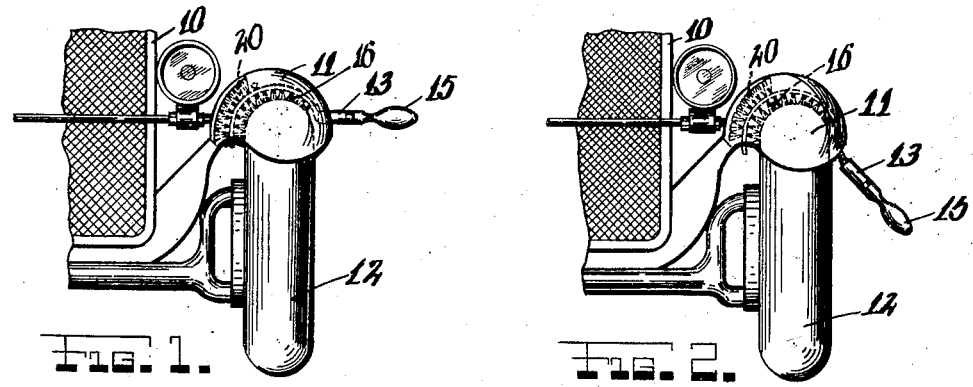
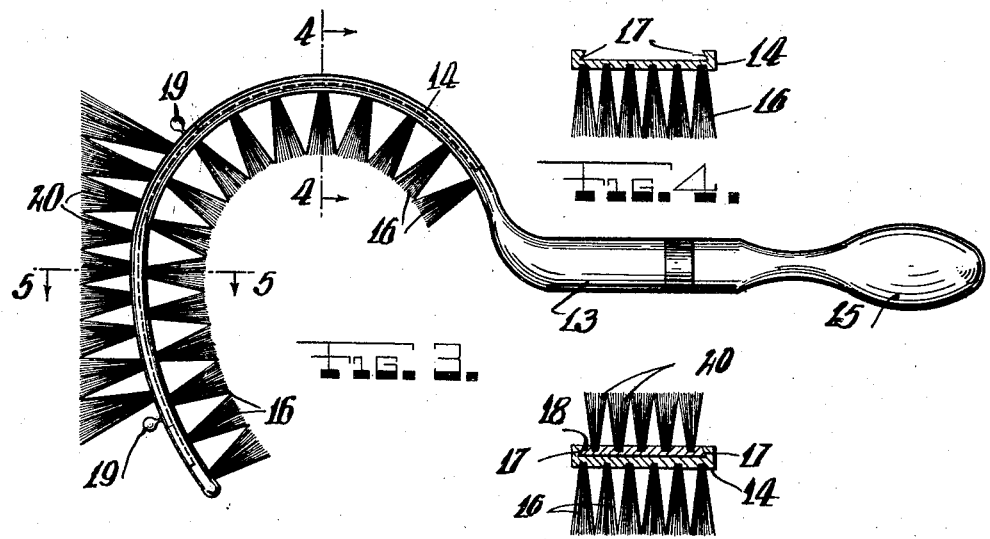
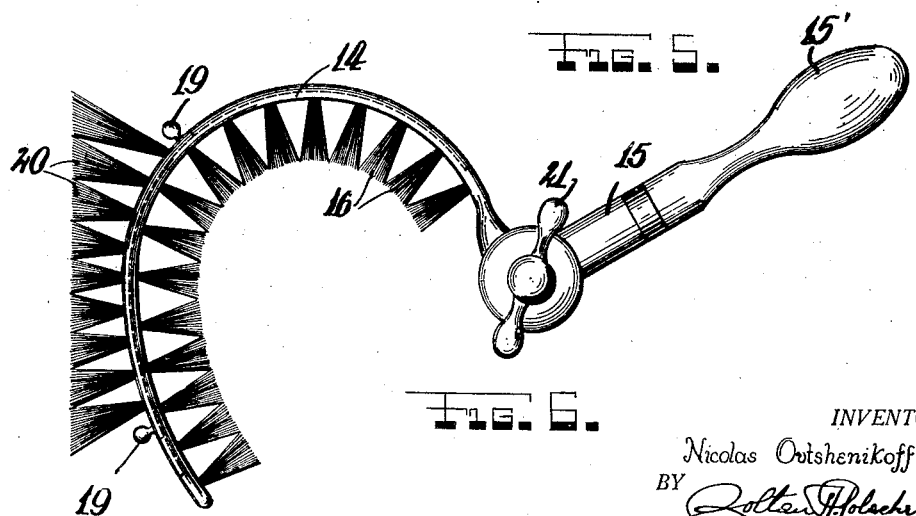

1,742,929

UNITED STATES PATENT OFFICE

NICOLAS OVTSHENIKOFF, OF NEW YORK, N. Y.

CLEANING BRUSH FOR AUTOMOBILE WHEELS AND FENDERS

Application filed August 18, 1928. Serial No. 300,484.

This invention relates generally to brushes, and has more particular reference to a novel cleaning brush for automobile wheels and fenders.

The invention has for an object the provision of a device of the class mentioned, which is of simple durable construction, desirable and efficient in action, and which can be manufactured and sold at a reasonable cost.

The invention proposes the use of a curved bar shaped for conforming with the general transverse contour of a vehicle wheel, and connnected with a manipulating handle, and provided with brush bristles projecting inwards from its inner side for engaging against a vehicle wheel, and with a slot for accommodating a flexible bar provided with projecting bristles arranged for engaging against the fenders of the vehicle simultaneous with the engaging of the first mentioned bristles against the wheel.

For further comprehension of the invention, and of the object and advantages thereof, reference will be had to the following description and accompanying drawings, and to the appended claims in which the various novel features of the invention are more particularly set forth.

In the accompanying drawing, forming a material part of this disclosure:—

Fig. 1 is a fragmentary elevational view of a vehicle, showing in particular one of the wheels thereof, and the cleaning brush applied thereto.

Fig. 2 is a similar view, but showing the brush in another position.

Fig. 3 is a side elevational view of the brush.

Fig. 4 is a vertical sectional view, taken on the line 4—4 of Fig. 3.

Fig. 5 is a horizontal sectional view, taken on the line 5—5 of Fig. 3.

Fig. 6 is a similar view to Fig. 3 showing a modified form of the invention.

The reference numeral 10 indicates generally the body of a motor vehicle having fenders such as 11, and wheels such as 12. During the operation of the vehicle, especially on rainy days, the underside of the fenders and the inner sides of the wheels become quite muddy and dirty. These positions are quite difficult to normally reach, but with the cleaning brush 13 the dirt and mud may be very easily removed. In Fig. 1 the brush is shown disposed between the wheel and the fender and needs only be worked around to accomplish cleaning. Fig. 2 shows another position of the brush. In both of these positions the brush should be worked around the periphery of the wheel for cleaning.

The brush 13 comprises a curved bar 14 shaped for conforming with the general transverse contour of the wheel, and connected with a handle 15 for manipulation, said handle and bar constituting substantially a sickle shape, and provided with brush bristles 16 projecting inwards from its inner side for engaging against the wheel. The bar 14 also has a dove-tailed slot 17 in its outer side, and a flexible bar 18 slidably engages therein. Handles 19 project from the ends of the bar 18, and brush bristles 20 project along the outer side of the bar and are arranged for engaging against the fenders of the vehicle simultaneously with the engaging of the bristles 16 against the wheel 12.

The bar 18 should have sufficient spring action for frictionally holding its position in the slot 17, and may be manually moved to new positions by reason of the handles 19. In new positions, the relative relation of the bristles 16 and 20 are changed for permitting adjustments to better adapt the device to fenders of different shapes.

In Fig. 6 I have shown a handle 15' attached to curved bar 14 by a joint so that the angle of the handle relative to the brush may be changed as desired and thereafter locked in the set positions by a wing screw 21 or the like.

It is particularly pointed out that the curved portion of the bar in the vicinity of its free end conforms in shape with the inner side of the tire, the remaining curved portion of the bar conforms in shape with the tread of said tire and the handle extends from the bar in a direction to project from between said tire and the fender of the car equipped with the tire. This is very clearly illustrated in Figs. 1 and 2. For cleaning, it is merely necessary to move the device in a circular path around the tire and between the tire and the fender.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A cleaning brush for automobile wheels and fenders, comprising a curved bar connected with a handle and forming substantially a sickle shape, the curved portion in the vicinity of the free end of the bar conforming in shape with the inner side of a tire, the remaining curved portion conforming in shape with the tread of said tire, and the handle extending from the bar in a direction to project from between said tire and a fender of a car equipped with the tire, said curved bar being provided with projecting brush bristles.

2. A cleaning brush for automobile wheels and fenders, comprising a curved bar connected with a pivotal handle and forming substantially a sickle shape, the curved portion in the vicinity of the free end of the bar conforming in shape with the inner side of a tire, the remaining curved portion conforming in shape with the tread of said tire, and the handle being extendable from the bar in a direction to project from between said tire and a fender of a car equipped with the tire, and a means for holding the handle in adjusted fixed positions, said curved bar being provided with projecting brush bristles.

3. A brush for cleaning automobile wheels and fenders, comprising a curved bar shaped for conforming with the general transverse contour of a vehicle tire, a handle connected therewith, brush bristles projecting inwards from the inner side of the bar and arranged for engaging against the inner sides of a vehicle wheel, the bar being formed on its outer side with a slot, a flexible bar slidably engaged in the slot and provided with handles, and brush bristles projecting from the flexible bar and arranged for engaging against the inner sides of a fender simultaneously with the engaging of the first mentioned bristles against a vehicle wheel.

4. A brush for cleaning automobile wheels and fenders, comprising a curved bar shaped for conforming with the general transverse contour of a vehicle tire, a handle connected therewith, brush bristles projecting inwards from the inner side of the bar and arranged for engaging against the inner sides of a vehicle wheel, the bar being formed on its outer side with a dove-tailed slot, a flexible bar slidably engaged in the slot and provided with handles, and brush bristles projecting from the flexible bar and arranged for engaging against the inner sides of a fender simultaneously with the engaging of the first mentioned bristles against a vehicle wheel.

5. A brush for cleaning automobile wheels and fenders, comprising a curved bar shaped for conforming with the general transverse contour of a vehicle tire, a handle connected therewith, brush bristles projecting inwards from the inner side of the bar and arranged for engaging against the inner sides of a vehicle wheel, the bar being formed on its outer side with a slot, a flexible bar slidably engaged in the slot and adapted for frictionally holding its position, and provided with handles, and brush bristles projecting from the flexible bar and arranged for engaging against the inner sides of a fender simultaneously with the engaging of the first mentioned bristles against a vehicle wheel.

In testimony whereof I have affixed my signature.

NICOLAS OVTSHENIKOFF.